United States Patent [19]
Jako

[11] Patent Number: 4,575,853
[45] Date of Patent: Mar. 11, 1986

[54] SEALED LASER

[76] Inventor: Geza J. Jako, 169 E. Emerson St., Melrose, Mass. 02176

[21] Appl. No.: 567,094

[22] Filed: Dec. 30, 1983

[51] Int. Cl.$^4$ ............................................. H01S 3/03
[52] U.S. Cl. ........................................ 372/61; 372/97; 372/107; 372/98; 372/92; 350/319
[58] Field of Search ................ 372/107, 61, 103, 108, 372/98, 92, 97; 350/319

[56] References Cited

U.S. PATENT DOCUMENTS

| | | | |
|---|---|---|---|
| 4,050,037 | 9/1977 | Knowles et al. | 372/107 |
| 4,203,080 | 5/1980 | Wright et al. | 378/103 |

*Primary Examiner*—William L. Sikes
*Assistant Examiner*—Léon Scott, Jr.
*Attorney, Agent, or Firm*—Charles Hieken

[57] ABSTRACT

A hard sealed $CO_2$ laser tube includes an impermeable envelope with flanges and seals joined by weldment and ultrahigh vacuum. A total reflecting mirror at the input is hard sealed and cooled at its back side. The plasma tube and cooling jacket are made of glass or ceramic construction. Metal-glass or glass-ceramic high voltage feedthroughs provide for connection to the internal electrodes. Feedthroughs using glass-metal sealing connect to the internal cooling jackets. The feedthroughs for electrical and cooling connections are at the total reflecting mirror end. A plastic base connector is attached to the metal structure at the total reflecting mirror end.

12 Claims, 16 Drawing Figures

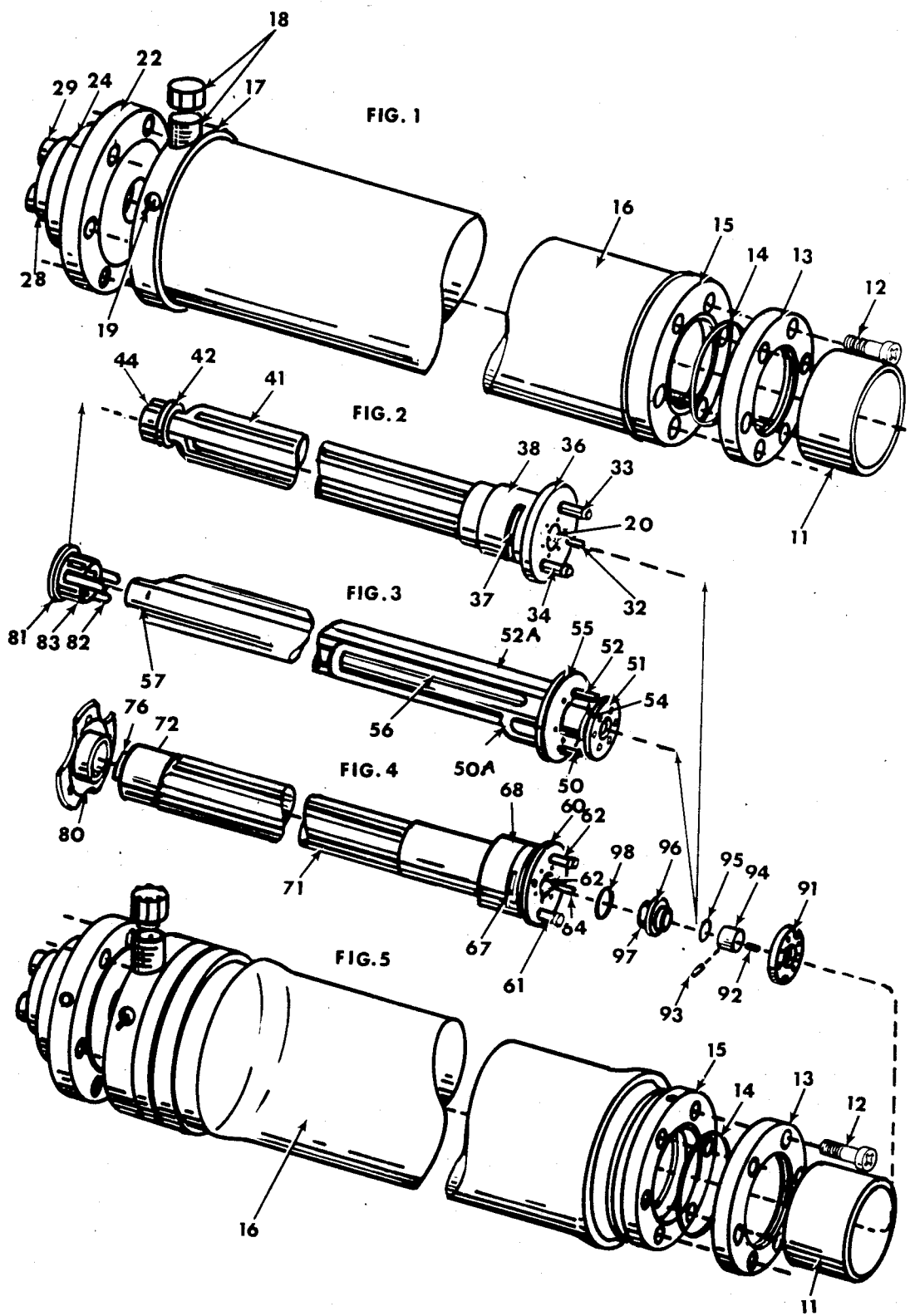

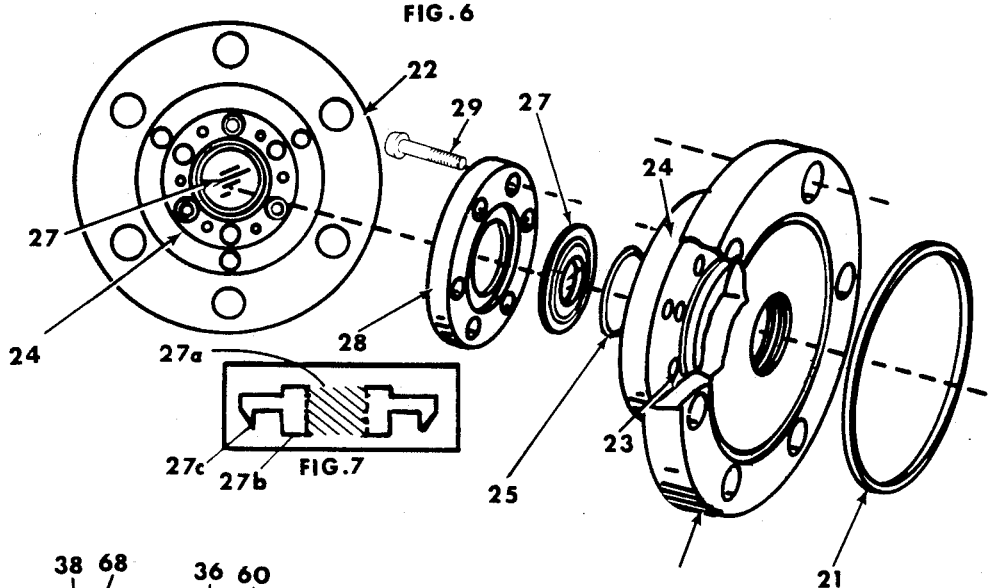
FIG. 6
FIG. 7
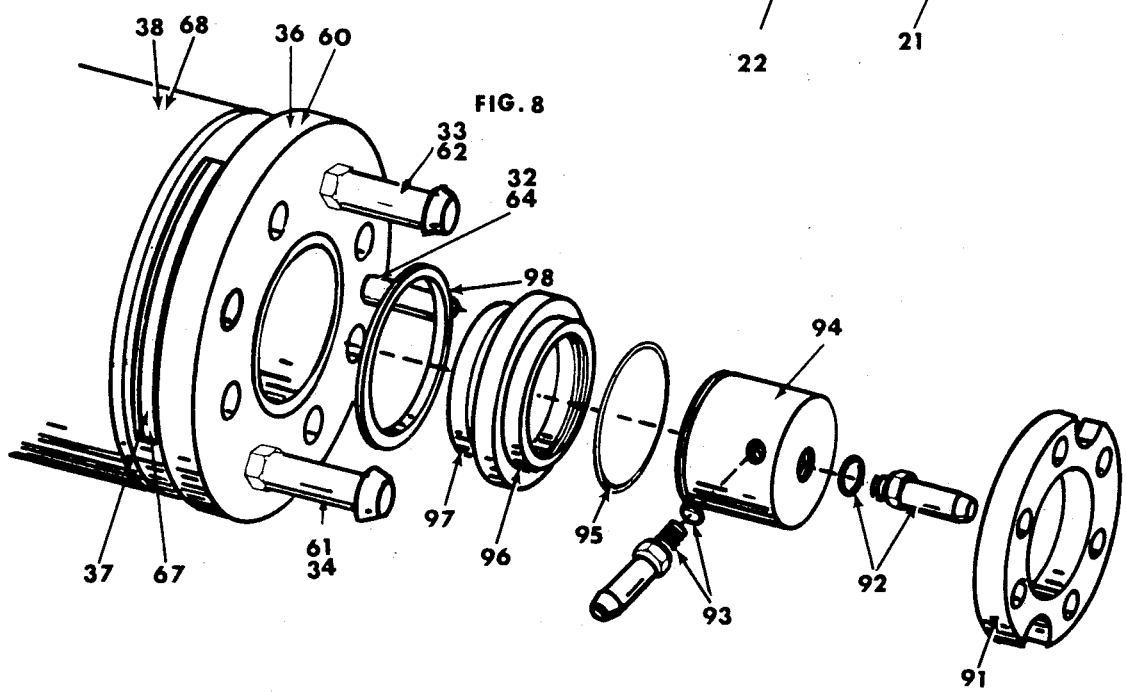
FIG. 8

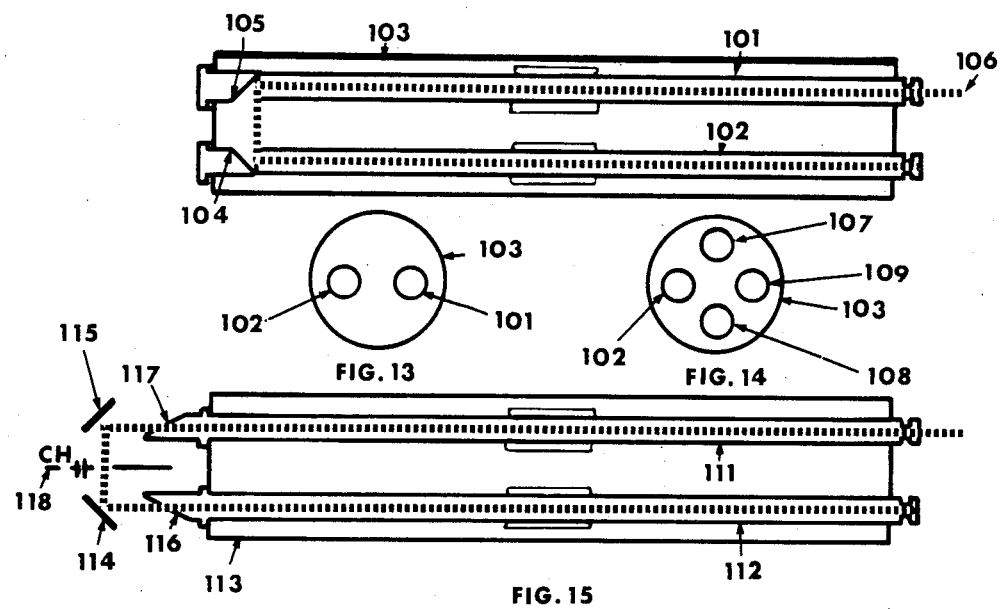
FIG. 12
FIG. 13
FIG. 14
FIG. 15
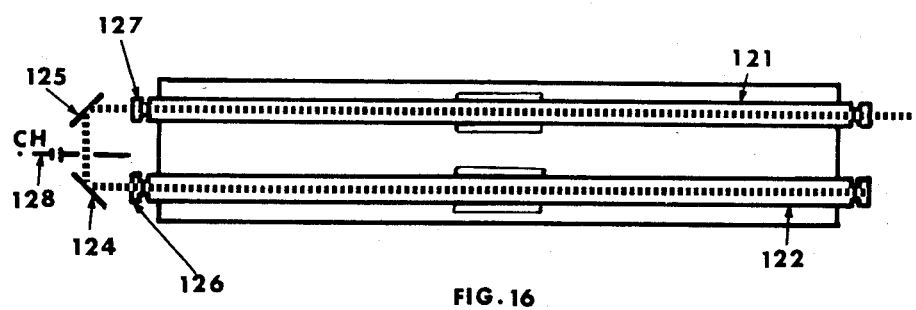
FIG. 16

SEALED LASER

The present invention relates in general to sealed lasers and more particularly concerns a novel totally hard sealed, bakable high output laser tube of metal, ceramic, glass construction of reduced complexity and cost and enhanced reliability.

For background reference is made to an article entitled "Development of a flyable $CO_2$ laser beacon in Optical Engineering for July/August 1982 beginning on page 794, noting on page 795 the absence of hard optical seals for a laser. A search of prior art uncovered U.S. Pat. Nos. 3,208,758, 3,596,202, 3,723,902, 3,745,482, 3,930,824 and 3,978,425.

Materials absorb infrared energy emitted by laser beams. This property makes infrared lasers useful in many manufacturing processes and for surgical applications in medicine. The highly collimated laser beam is also useful for communication purposes.

Gas lasers, such as carbon dioxide lasers, used for most medical and industrial applications requiring medium powered lasers, use flowing gas techniques to establish a lasing medium inside the laser tube. This technique wastes gases exhausted from the tube, usually into a closed atmosphere inside a room. This technique adds to expense and size because extra gas tanks and vacuum pumps are necessary for operation. Higher output lasers incorporate recirculating systems to reduce gas consumption; however, the recirculating system adds to the cost and bulk.

Sealed lasers reduce gas waste and bulk; however, it is difficult to effect a good demountable hard seal.

Accordingly, it is an important object of the invention to provide an improved sealed gas laser tube.

According to the invention, there is a hard sealed laser tube system, including means for hard sealing the output mirrors. Preferably, the laser tube includes an envelope of metal or glass construction. Means, such as welds and ultrahigh vacuum metal seals, maintain an exceptionally tight seal between the metal parts. A plasma tube water jacket is attached to a base plate with metal-glass or metal-ceramic sealing techniques and feedthroughs. The ends of the laser tube include adjustable mirror holders, preferably of one piece metal construction. A cathode inside the metal envelope is shaped and constructed so that it operates at high temperature, and coating means on the cathode allow better recombination of the gas inside the envelope, typically carbon dioxide.

Preferably the metal envelope is grounded. Preferably the anode means are of noble metal, such as platinum, gold or silver. The entire structure is bakable at high temperature, typically within the range of 200°-350° C.

The total reflecting mirror is preferably of metal construction and mechanically hard sealed for ultrahigh vacuum and water impermeability. This arrangement facilitates cooling this mirror. Preferably, the metal envelope and the metal ends and mirror holding structures are made of stainless steel or low expansion metal alloys. Preferably demineralized water or other coolant effects cooling.

A feature of the invention resides in the easy disassembly of the tube to facilitate changing parts, such as ceramic insulator apertures. The metal and ceramic materials are rugged, can be machined to close tolerances and thereby facilitate construction and alignment.

The water and unground high voltage electrical connections may be at one end with a safe strong plastic connector to facilitate construction of safe laser surgical systems.

Numerous other features, objects and advantages of the invention will become apparent from the following specification when read in connection with the accompanying drawing in which:

FIGS. 1 and 5 are perspective cutaway partially exploded views of embodiments of metal and glass envelope assemblies, respectively, according to the invention;

FIGS. 2-4 are perspective views of different internal structures suitable for insertion into the envelope assemblies of FIGS. 1 and 5;

FIG. 6A is an exploded view of end structural arrangement according to the invention;

FIG. 6B is an end view of the assembly shown exploded in FIG. 6A;

FIG. 7 is a diametrical sectional view of the output mirror assembly;

FIG. 8 is an exploded view of one end of the invention;

FIG. 12 illustrates an embodiment of the invention having two lasers according to the invention in a folded path with internal reflection;

FIG. 13 is a diagrammatical transverse sectional view of the embodiment of FIG. 12;

FIG. 14 is a diagrammatical sectional view of a modification of the embodiment of FIGS. 12 and 13 having four lasers in space quadrature;

FIG. 15 illustrates an embodiment of the invention with two lasers according to the invention and external mirrors mounted on a 45° end surface; and FIG. 16 illustrates an embodiment of the invention having two lasers according to the invention with external reflectors coupled to the inside of the tube through partially reflecting mirrors.

Figure 9:
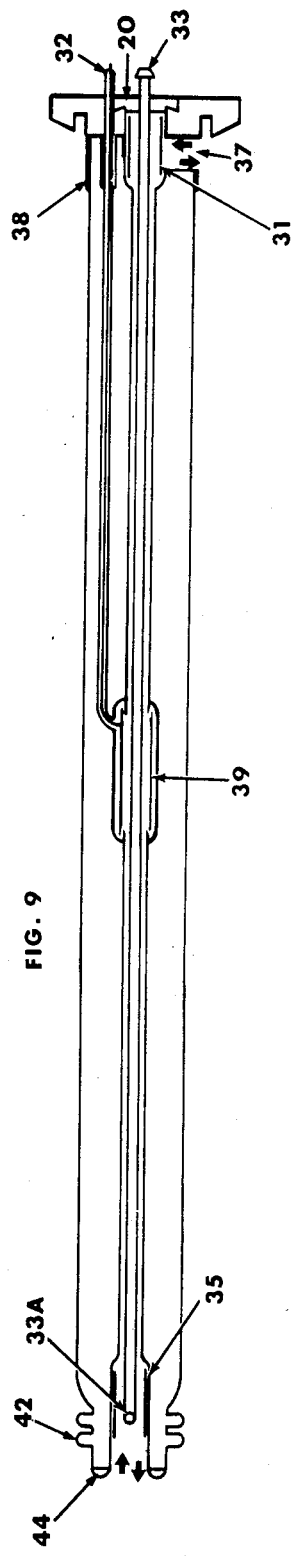
FIGS. 9-11 show side views of the internal structures of FIGS. 2-4, respectively.

With reference now to the drawing and more particularly FIG. 1 thereof, there is shown a perspective view of an embodiment of the invention partially exploded and with a central portion cut away. The laser tube envelope comprises a threaded plastic protective insulating ring 11 that is screwed into rotary flange 13 formed with six clear openings for accommodating bolts, such as 12, for fastening ring 13 to fixed flange 15 formed with six tapped openings in sealing arrangement with metal gasket 14, typically a copper gasket. Fixed flange 15 is welded to envelope 16 when made of metal or heat sealed to establish a hard glass-metal seal when envelope 16' (FIG. 5) is glass or ceramic. A similar fixed flange 17 is sealed to the other end of envelope 16 and carries a vacuum valve 18 for evacuating the inside of envelope 16. Rotary flange 22 is formed with six clear openings for receiving bolts, such as bolt 29, to fasten that assembly to fixed flange 17. Anode ceramic-metal feedthrough terminal 18 on ring 17 may be connected to ground after lasing begins. Adjustable mirror holder 24 is hard sealed to rotary flange 22, typically by welding, and hard sealed to mirror holding flange 28.

Referring to FIG. 2, there is shown one form of internal structure according to the invention. FIG. 2 shows a three-electrode structure which is coaxially seated within metal envelope 16 in FIG. 1 or glass or ceramic envelope 16' in FIG. 5. This structure includes a metal internal structure flange 36 carrying coolant access nozzles 33 and 34, and cathode feedthrough 32, and having a vacuum joint 20 for the total reflector. Internal structure flange 36 is adjacent ported sleeve 38 having a gas port 37. A cooling jacket 41 carries coolant for removing heat. Metal bellows 42 allows length changes while maintaining the seal and avoiding damaging stresses in the structure. End ring 44 is adjacent bellows 42 and resides in end support prongs 82 of end support perforated sleeve 83 of end support 81 (FIG. 3) which in turn fits in a central opening of fixed flange 17 (FIGS. 1 and 5).

Referring to FIG. 3, there is shown an alternative form of internal structure having two electrodes preferably used with the envelope of FIG. 5. Coolant nozzles 50 and 52 protrude from vacuum flange 55 and pass through mirror vacuum joint 51. Kovar alloy metal ring 54 functions as an electrode connector. Coolant pipes 50A and 52A are connected to coolant nozzles 50 and 52, respectively. A glass end ring 57 may be seated in end support prongs 82. A gas path extending conduit 56 extends the effective length of the gas path between electrodes and assures gas circulation indicated by arrows and prevents external discharge.

Referring to FIG. 4, there is shown still another form of internal structure according to the invention having three electrodes partially exploded and partially cut away with an exploded view of structure at the total reflector end of a form also used with the internal structures of FIGS. 2 and 3 and shown magnified in FIG. 8. This structure includes internal structure flange 60, typically having an angle of 22.5° with the tube axis, coolant nozzles 61 and 62, cathode feedthrough 64, and gas port 67 in ported sleeve 68. Cooling jacket 71 carries coolant for withdrawing heat. End 76 of anode 73 nests within insulating metal-ceramic end support assembly 80. Assembly 80 resides within fixed flange 17.

The elements at the total reflecting end shown in FIG. 4 and best seen in FIG. 8, common to all three internal structures shown in FIGS. 2, 3 and 4, include holding flange 91, mirror coolant nipples 92 and 93 and associated O-rings that screw in plastic seal 94. The threaded end of plastic seal 94 passes through rubber O-ring 95 and screws in the threaded opening in mirror support 96 of the mirror assembly also including metal mirror 97. Sealing ring 98 (FIG. 8) insures a good vacuum seal against an internal structure flange, such as 36, 55 and 60 in FIGS. 2, 3 and 4, respectively, with holding flange 91 bolted in place.

Referring to FIG. 6A, there is an exploded view of end structural arrangement according to the invention showing structure at the output end. Sealing ring 21, typically copper, seats in a recess in output end rotary flange 22. Metal bellows 23 is between output end rotary flange 22 and adjustable mirror holder flange 24. A metal gasket 25 seals output mirror assembly 27 with adjustable mirror holder 24. Holding flange 28 clamps these elements to flange 24 with six bolts, such as 29. FIG. 6B is an end view of the assembly shown exploded in FIG. 6A.

Referring to FIG. 7, there is shown a sectional view through output mirror assembly 27 showing output mirror 27A, metal holding ring 27B and vacuum joint edge 27C. Output mirror 27A is typically zinc selenide and may be fused to metal holding ring 27B, typically a metal alloy with a thermal expansion coefficient slightly greater than that of zinc selenide to form a bond with the zinc selenide upon cooling.

Referring to FIG. 9, there is shown an axial sectional view of the three-electrode internal glass structure shown in FIG. 2. This view better illustrates the anode 31 at the total reflecting end, the anode 35 at the output end which is connected to anode lead 19 (FIG. 1), and coaxial cathode 39, which is preferably nickel of high purity. Cathode connection is through a glass tube having a glass-metal seal at flange 36. Arrows indicate gas circulation. The output end 33A of cooler 33 is shown.

Figure 10:
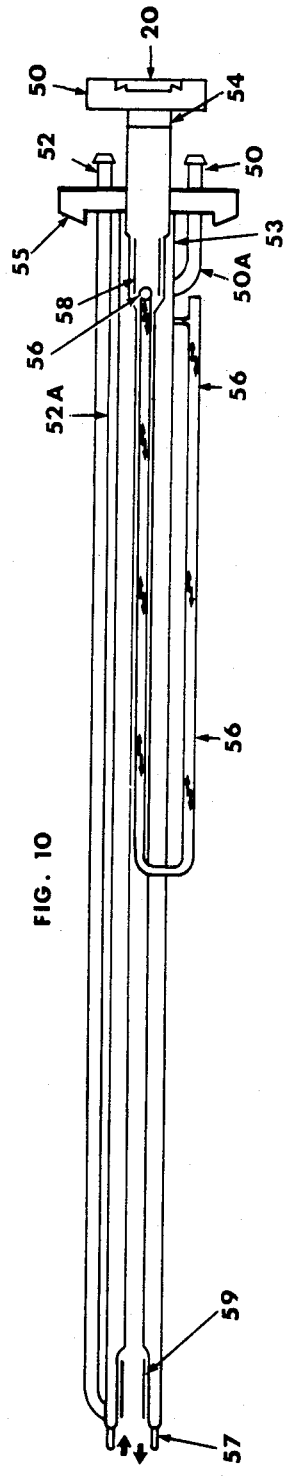

Referring to FIG. 10, there is shown an axial sectional view of the two-electrode internal structure of FIG. 3 showing the gas extending conduit 56 with a cathode 59 at the output end and an anode 58 connecting to Kovar ring 54 at the total reflecting end. A gas mixture, typically including $CO_2$, moves as indicated by arrows.

The totally reflecting mirror assembly 96, 97 is totally hard sealable with metal gasket 98. It may be made of one metal, preferably hard stainless steel, such as 420F, or two metals, such as copper and stainless steel 304L, which are brazed or laser welded together. The reflecting mirror surface may be flat or curved and manufactured with standard techniques, such as electroplating, polishing, coating, and diamond-cutting. This assembly may be easily liquid cooled. Metal gasket 98 allows precision adjustment of mirror 97.

Figure 11:
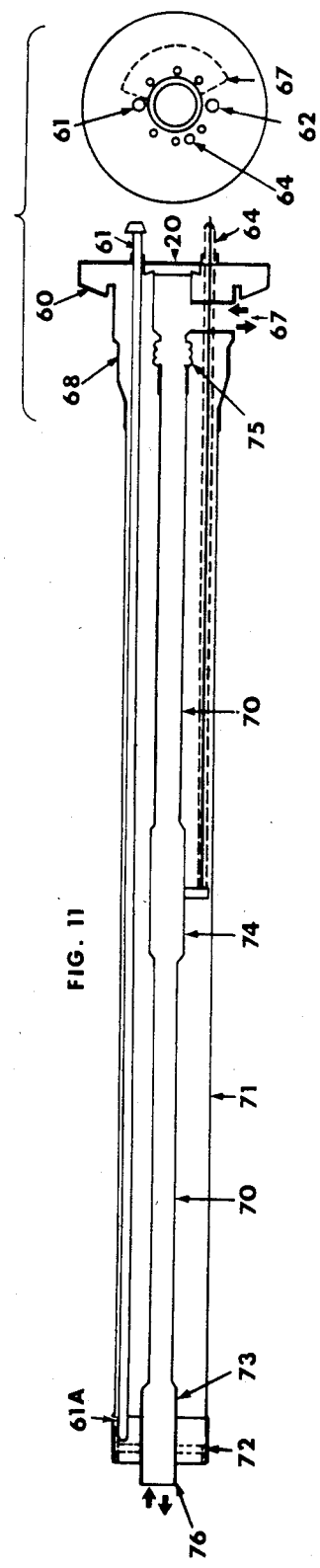

Referring to FIG. 11, there is shown an axial sectional view through the three-electrode internal structure of FIG. 4 excluding the total reflecting end and output end elements, common to all three internal structures. Cathode 74 is shown in the middle midway between total reflecting end anode 75 and output end anode 73. This internal structure is typically glass-metal or ceramic-metal construction. The Kovar cathode is preferably coated outside with ceramic for insulation and electroplated inside, preferably with nickel of high purity. The coolant is nonconducting, such as demineralized water or dielectric fluid. For a long tube the cathode is preferably formed of two pieces welded at the center. The anode 75 is preferably a metal bellows plated with noble metal. Kovar anode 73 is also plated with noble metal. Kovar end 72 is welded to Kovar anode assembly 73. The end 76 of anode assembly seats in insulating metal-ceramic assembly 80. A plastic coolant tube 61 may be inserted after baking as well as a silicon rubber sleeve over cathode connecting wire 64.

Referring to FIG. 12, there is shown a diagrammatic representation of a pair of internal structures 101 and 102 of the type described in connection with FIGS. 2–4 above according to the invention seated inside a housing 103 effectively cascaded through internal reflections from mirrors 104 and 105 to produce a laser output beam at 106 of nearly twice the power of a single internal structure in a package of length slightly longer than that of a single internal structure. Referring to FIG. 13, there is shown an end view of this diagrammatic representation.

Referring to FIG. 14, there is shown an end view of a variation of the embodiment of FIGS. 12 and 13 that comprises two additional internal structures 107 and 108 to provide an output power nearly four times that of an individual internal structure in a casing of length substantially corresponding to that of a single tube. The reflecting means not specifically shown in FIG. 14 may comprise internal reflecting means like 104 or 105 in FIG. 12 or external reflecting means like 114 or 115 in FIG. 15, that extend the length through reflection four times.

Referring to FIG. 15, there is shown a diagrammatic representation of another assembly of laser internal structures 111 and 112 according to the invention seated in casing 113 intercoupled externally by external reflectors 114 and 115 with the beam passing through Brewster windows 116 and 117. A Q switch 118 intermittently intercepts the beam in a known manner to produce a pulsed laser beam.

Referring to FIG. 16, there is shown still another assembly of components in which laser tube 121 may function as a laser amplifier and laser tube 122 as a laser oscillator intercoupled by external mirrors 124 and 125 with the beams passing through partially reflecting mirrors 126 and 127. Q switch 128 may intermittently interrupt the beam.

The invention has a number of advantages. The metal-ceramic construction helps make the invention practical for medical uses and for unit construction. The outside metal envelope allows the laser tube to be self-supporting when clamped at one end. The invention may be made in many different sizes, including embracing the range from 1 to 4 feet, or larger or smaller.

Because of the construction the bore tube inside the envelope can be easily changed or made in different sizes and diameters. A small bore size may be used for waveguide action. The tube may accommodate two, three or more electrodes which may be used in waveguide lasers.

The demountable hard seal construction facilitates easy replacement of internal components to permit reuse of costly components. The use of high temperature material allows baking to temperatures from 200°-350° Centigrade. The individual parts being metal, ceramic or glass allow sophisticated cleaning and baking techniques practiced in vacuum tube technology.

The metal envelope construction allows the use of material, such as Invar, having low temperature coefficients, to facilitate cavity stabilization.

The metal-ceramic construction allows maintenance of close manufacturing tolerances for precise alignment. The metal seals and metal gaskets further aid in precision alignment. The metal construction allows for insertion of additional ports to facilitate adding a catalyst or insertion of a heated platinum wire, or the insertion of a rotary vacuum seal ceramic aperture component. Such a rotary vacuum component may be vacuum sealed to allow moving an aperture along and outside the axis of the laser tube.

The metal envelope size may be increased to accommodate multiple internal structures. The individual precision alignment of these structures is facilitated by the compressible gaskets.

It may be used for ultra-high precision optical alignment because the laser is rugged and allows for easy transportation in the laser tube itself or when built into a system. The internal structure may be relatively easily removed for service or repair. Construction may use proven techniques for metal joining and electron beam welding or laser welding.

The plating of the components, such as the electrodes and the metal bellows, may be done with electroplating. The metal bellows allow heat expansion and can compensate for differences in heat expansion, which primarily occurs when the tube is baked within the range of 200°-350° centigrade.

Enlarging the envelope creates a larger gas reservoir, and extra gas reservoirs outside the envelope may be added to the system easily.

A glass viewing port may be formed in the metal envelope to allow examination of the internal structures and the gas discharge. The gas discharge may also be visible through the glass or ceramic parts, even when a ceramic tube is used for both the plasma tube and for the cooling jacket. The ports also allow for insertion of thermocouples for temperature measurements.

An important feature of the invention, particularly characterizing the embodiment of FIG. 4, is that during baking and evacuation the cooling jacket is outside the vacuum area, and a plastic tube for insulation, or for fluid, or even air cooling, may be inserted after the tube is already baked and filled with gas.

The metal construction also facilitates using different sizes of electrodes in terms of both length and diameter to minimize the so-called cathode fall. The cathode may also be constructed from different materials, including ceramics to allow higher temperature heating of the electrode material.

The tubular metal seal is demountable and placed close to the output end of the mirror near the zinc selenide output window. A copper tube passing through a valve in this seal may be used during the processing as a cooling trap to help keep material from depositing on the output mirror. The demountable metal seal 18 may be replaced. Since debris tends to gather toward the cooler portions of the structure, use of the copper tubing for evacuating during baking helps insure that no debris remains in the tube on critical components. At the conclusion of the evacuating, the copper tube may be crimped near the valve to establish a good hard vacuum, and the crimping tool will also sever the tube in accordance with known techniques.

The ceramic metal feedthrough at the output end allows floating of the anode, or it can be grounded. The output end and the mirror holder assembly with metal bellows allow both major and fine adjustment.

There has been described novel apparatus and techniques for making a hard sealed demountable repairable gas laser tube in relatively compact form in a sealed system. Using a metal envelope facilitates adding additional high vacuum seal ports to permit internal access for catalysis, gas exchange and gas analysis. The invention allows higher baking temperatures to better clean the tube, thereby expanding shelf and useful life. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. A hard sealed gas laser tube comprising,
   an internal electrode structure,
   envelope means for surrounding said internal electrode structure between first and second fixed flange means for establishing vacuum seals at each end,
   first and second outside flange means outside said envelope means for engagement with said first and second fixed flange means respectively,
   means for fastening said first and second outside flange means to said first and second fixed flange means respectively to establish a vacuum seal therewith, said internal electrode structure being inside said envelope means between said first and second fixed flange means, said internal electrode structure including an internal structure flange for coacting with said first fixed flange means for establishing a vacuum seal therewith.

said internal electrode structure including at least first and second electrodes for establishing an electric field therebetween, means defining a gas port for allowing gas to flow within said envelope means.

cooling means coupled to said internal electrode structure for carrying a coolant to withdraw heat from within said envelope means, feedthrough means passing through said internal flange means for establishing electrical connection to at least one of said first and second electrodes, coolant nozzle means carried by said internal flange means for exchanging coolant with said cooling means, total reflecting means and output mirror means for reflecting optical energy, first and second mirror support means in vacuum sealing relationship to said first and second outside flange means, respectively, for supporting said total reflecting means and said output mirror means, respectively, in positions to coact with said internal electrode structure for establishing lasing, and transmitting means including said output mirror means for maintaining a sealed enclosure within said envelope means while transmitting a laser beam therethrough developed within said envelope means.

2. A hard sealed gas laser tube in accordance with claim 1 wherein said internal electrode structure includes gas port defining means near said internal structure flange for allowing lasing gas to flow therethrough inside said envelope means.

3. A hard sealed gas laser tube in accordance with claim 2 wherein said port defining means comprises a ported sleeve adjacent to said internal structure flange means.

4. A hard sealed gas laser tube in accordance with claim 2 wherein said port defining means comprises a U-shaped tube having an opening near said internal structure vacuum flange.

5. A hard sealed gas laser tube in accordance with claim 2 and further comprising,
    an end support at the output end of said internal structure seated in said second fixed flange means.

6. A hard sealed gas laser tube in accordance with claim 1 and further comprising
    adjusting means for altering the position of said second mirror support means to position said output mirror means for establishing lasing.

7. A hard sealed gas laser tube in accordance with claim 1 and further comprising,
    vacuum valve means carried by one of said fixed flange means for evacuating the inside of said envelope means.

8. A hard sealed high output gas laser tube in accordance with claim 1 and further comprising,
    a second of said internal electrode structures,
    a sealed casing for supporting said first-mentioned and said second internal electrode structures,
    said first-mentioned and second internal electrode structures being seated in said casing in side-by-side relationship with the length of said casing being slightly longer than the length of each of said internal electrode structures,
    first and second reflecting means near one end of said casing for intercoupling the laser beams in said first-mentioned and said second internal electrode strucures,
    and light transmissive means near the other end of said casing for transmitting laser beam energy from said second internal electrode structure.

9. Laser apparatus in accordance with claim 8 wherein said reflecting means is inside said casing.

10. Laser apparatus in accordance with claim 8 wherein said reflecting means is outside said casing.

11. Laser apparatus in accordance with claim 10 and further comprising first and second Brewster windows intercoupling said first and second internal structures with said first and second reflecting means respectively.

12. Laser apparatus in accordance with claim 8 wherein said first internal structure comprises a laser oscillator,
    and said second internal structure comprises a laser amplifier.

* * * * *